United States Patent
Stanhope

(10) Patent No.: US 11,301,694 B2
(45) Date of Patent: Apr. 12, 2022

(54) DETECTING PLUGGING OF GROUND-ENGAGING TOOLS OF AN AGRICULTURAL IMPLEMENT FROM IMAGERY OF A FIELD USING A MACHINE-LEARNED CLASSIFICATION MODEL

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

(*) Notice: Subject to any disclaimer, the term of this patent is extended or adjusted under 35 U.S.C. 154(b) by 286 days.

(21) Appl. No.: 16/433,532

(22) Filed: Jun. 6, 2019

(65) Prior Publication Data

US 2020/0387720 A1    Dec. 10, 2020

(51) Int. Cl.
| | |
|---|---|
| *G06K 9/00* | (2006.01) |
| *A01B 79/02* | (2006.01) |
| *G06K 9/62* | (2006.01) |
| *A01B 76/00* | (2006.01) |
| *A01C 5/06* | (2006.01) |

(52) U.S. Cl.
CPC .......... *G06K 9/00791* (2013.01); *A01B 76/00* (2013.01); *A01B 79/02* (2013.01); *G06K 9/6268* (2013.01); *A01C 5/064* (2013.01)

(58) Field of Classification Search
CPC .......... G06K 9/00791; G06K 9/00624; G06K 9/6268; G06K 9/6267; G06K 9/68; G06K 9/00; A01B 76/00; A01B 79/02; A01B 79/00; A01C 5/064; A01C 5/062; A01C 5/06; A01C 5/00
See application file for complete search history.

(56) References Cited

U.S. PATENT DOCUMENTS

| | | | |
|---|---|---|---|
| 4,288,814 | A | 9/1981 | Talley et al. |
| 5,956,079 | A | 9/1999 | Ridgley |
| 9,282,688 | B2 | 3/2016 | Casper et al. |
| 9,382,003 | B2 | 7/2016 | Harm et al. |
| 9,481,294 | B2 | 11/2016 | Sauder |
| 9,485,900 | B2 | 11/2016 | Connell et al. |
| 10,104,827 | B2 | 10/2018 | Adamchuk et al. |
| 10,165,725 | B2 | 1/2019 | Sugumaran et al. |
| 10,178,828 | B2 | 1/2019 | Hendrickson et al. |

(Continued)

FOREIGN PATENT DOCUMENTS

EP          3165406          8/2018

*Primary Examiner* — Christopher J. Novosad
(74) *Attorney, Agent, or Firm* — Rebecca L. Henkel; Rickard K. DeMille

(57) ABSTRACT

In one aspect, a computing system may be configured to perform operations including obtaining image data that depicts a portion of a field positioned aft of a ground-engaging tool of an agricultural implement relative to a direction of travel of the agricultural implement. The operations may also include inputting the image data into a machine-learned classification configured to receive imagery and process the imagery to output one or more visual appearance classifications for the imagery. Furthermore, the operations may include receiving a visual appearance classification of the image data as an output of the machine-learned classification model. Additionally, the operations may include determining when the ground-engaging tool is plugged based on the visual appearance classification of the image data.

17 Claims, 7 Drawing Sheets

(56) References Cited

U.S. PATENT DOCUMENTS

2017/0344004 A1   11/2017  Foster et al.
2018/0027725 A1   2/2018   Koutsorodi et al.
2018/0184581 A1   7/2018   Morgan et al.
2018/0210443 A1   7/2018   Matsuzaki

DETECTING PLUGGING OF GROUND-ENGAGING TOOLS OF AN AGRICULTURAL IMPLEMENT FROM IMAGERY OF A FIELD USING A MACHINE-LEARNED CLASSIFICATION MODEL

FIELD OF THE INVENTION

The present disclosure generally relates to plugging of ground-engaging tools of an agricultural implement and, more particularly, to detecting plugging of ground-engaging tools of an agricultural implement from imagery of a field using a machine-learned classification model.

BACKGROUND OF THE INVENTION

Modern farming practices strive to increase yields of agricultural fields. In this respect, seed-planting implements are towed behind a tractor or other work vehicle to disperse or otherwise plant seed throughout a field. As such, seed-planting implements generally include various ground-engaging tools (e.g., gauge wheels, disc openers, closing discs/wheels, press wheels, and/or the like) for use in performing the seed-planting operation. For example, as a seed-planting implement is moved across the field, the disc openers may form one or more furrows in the soil, with the gauge wheels setting the depth of such furrow(s). Furthermore, one or more dispensing devices may, in turn, deposit the seeds into the furrow(s). After deposition of the seeds, the closing discs/wheels close the furrow(s) in the soil, and the press wheels pack the soil on top of the deposited seeds.

During seed-planting operations, soil and/or residue may accumulate on the ground-engaging tools of the seed-planting implement. In certain instances (e.g., when the soil is wet and/or heavy), the amount of soil/residue accumulating on the ground-engaging tools may be sufficient to inhibit the operation of the tools such that the tools become plugged. In such instances, poor furrow quality and incorrect seed deposition may occur. As such, systems have been developed that attempt to detect plugged ground-engaging tools. However, such systems suffer from various drawbacks or disadvantages, in particular with respect to the accuracy of the plugging detection.

Accordingly, an improved system and method for detecting plugging of ground-engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a computing system. The computing system may include one or more processors and one or more non-transitory computer-readable media that collectively store a machine-learned classification model configured to receive imagery and process the imagery to output one or more visual appearance classifications for the imagery. Furthermore, the one or more non-transitory computer-readable media collectively store instructions that, when executed by the one or more processors, configure the computing system to perform operations. The operations may include obtaining image data that depicts a portion of a field positioned aft of a ground-engaging tool of an agricultural implement relative to a direction of travel of the agricultural implement. The operations may also include inputting the image data into the machine-learned classification model. Moreover, the operations may include receiving a visual appearance classification of the image data as an output of the machine-learned classification model. Additionally, the operations may include determining when the ground-engaging tool is plugged based on the visual appearance classification of the image data.

In another aspect, the present subject matter is directed to a computer-implemented method. The computer-implemented method may include obtaining, with a computing system comprising one or more computing devices, image data that depicts a portion of a field positioned aft of a ground-engaging tool of an agricultural implement relative to a direction of travel of the agricultural implement. The computer-implemented method may also include inputting, with the computing system, the image data into a machine-learned classification model configured to receive imagery and process the imagery to output one or more visual appearance classifications for the input data. Furthermore, the computer-implemented method may include receiving, with the computing system, a visual appearance classification of the image data as an output of the machine-learned classification model. Additionally, the computer-implemented method may include determining, with the computing system, when the ground-engaging tool is plugged based on the visual appearance classification of the image data.

In a further aspect, the present subject matter is directed to an agricultural implement. The agricultural implement may include a tool configured to engage soil within a field as the agricultural implement is moved across the field. Furthermore, the agricultural implement may include an imaging device having a field of view directed to a portion of the field aft of the tool relative to a direction of travel of the agricultural implement. The imaging device may, in turn, be configured to capture image data indicative of a visual appearance of the portion of the field within the field of view. Additionally, the agricultural implement may include a controller communicatively coupled to the imaging device. The controller may include one or more processors and one or more non-transitory computer-readable media that store instructions that, when implemented by the one or more processors, configure the controller to receive the image data from the imaging device and determine when the tool is plugged based on the received image data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
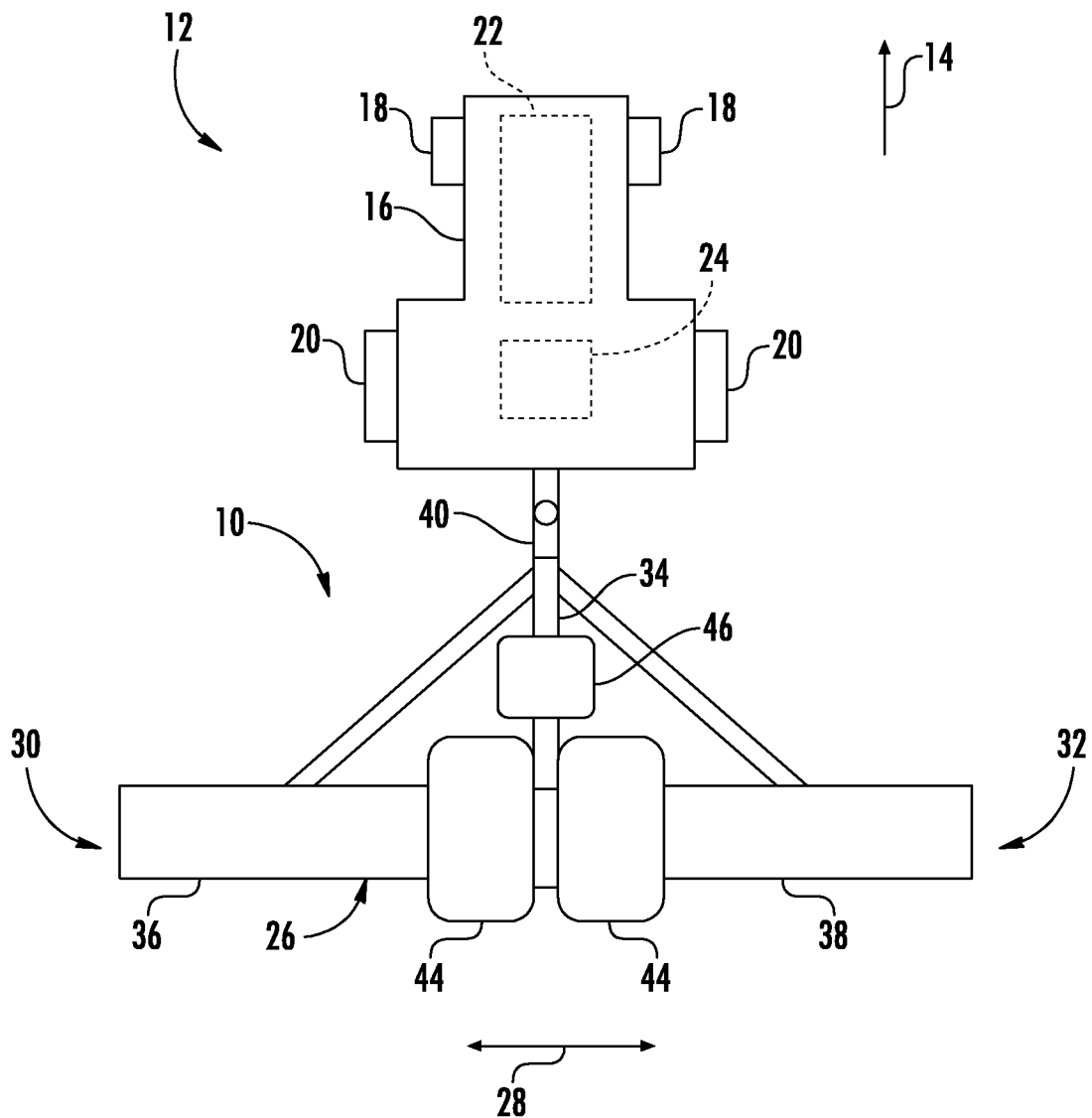
FIG. 1 illustrates a top view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting plugging of ground-engaging tools of an agricultural implement. For example, a ground-engaging tool of an agricultural implement may be "plugged" when a sufficient amount of soil and/or residue has accumulated on and/or around the tool such that the operation of the tool is impeded. Specifically, in several embodiments, the disclosed systems and methods may include or otherwise leverage a machine-learned classification model to determine when one or more ground-engaging tools of an agricultural implement are plugged based at least in part on imagery of the field across which the implement is being moved. As such, the machine-learned classification model may be configured to receive imagery, process the received imagery of the field to produce or determine one or more quantifiable parameters representative of the visual appearance of the imagery (known as feature extraction), and compute or output one or more visual appearance classifications for such imagery.

In several embodiments, a computing system of the disclosed system may receive image data captured by one or more imaging devices (e.g., a camera(s) or a LIDAR sensor(s)). Specifically, the imaging device(s) may have a field(s) of view directed to a portion(s) of the field positioned aft of the ground-engaging tool(s) of the agricultural implement relative to its direction of travel. In one embodiment, the field(s) of view of the imaging device(s) may be directed to a portion(s) of the field positioned entirely aft of the ground-engaging tool(s). As such, the imaging device(s) may be configured to capture data indicative of the visual appearance (e.g., the color, texture, contrast, and/or the like) of the field after performance of an agricultural operation by the ground-engaging tool(s). In this regard, the computing system may input the received image data into the machine-learned classification model and, in response, receive a one or more visual appearance classifications for the image data as the output of the machine-learned classification model. For example, the output of the machine-learned classification model may classify the image data as having a plugged visual appearance or a non-plugged visual appearance. Thereafter, the computing system may determine whether one or more of the ground-engaging tools of the implement are plugged at least in part based on the visual appearance classification of the image data.

Additionally, when it is determined that one or more ground-engaging tools of the implement are plugged, the systems and methods of the present disclosure may initiate one or more control actions associated with de-plugging the tool(s). For example, the ground speed of the implement, the penetration depth of the ground-engaging tool(s), the force applied to the ground-engaging tool(s), and/or any other suitable operating parameters of the implement and/or an associated work vehicle may be adjusted to de-plug the tool(s) and/or prevent further plugging of the tool(s). Thus, the systems and methods of the present disclosure may enable improved real-time control that eliminates or reduces plugging of the ground-engaging tool(s) of the implement during field operations.

Through the use of a machine-learned classification model, the systems and methods of the present disclosure may detect plugging of the ground-engaging tools of an agricultural implement with greater accuracy. These more accurate detections of plugging may enable improved and/or more precise control of the implement and/or the associated work vehicle to de-plug plugged ground-engaging tool(s) and/or prevent or reduce future plugging of the tool(s), thereby leading to superior agricultural outcomes for the field operation(s) being performed.

Furthermore, although aspects of the present disclosure are discussed primarily with respect to the detection of plugged ground-engaging tools, the systems and methods of the present disclosure can be generalized or extended to detect other indicators of ground-engaging tool performance. For example, aspects of the present disclosure, such as a machine-learned classification model, may also be applied to detect rocks or field debris being dragged by the ground-engaging tools. For example, the machine-learned classification model can be trained on different training data so that it recognizes (e.g., classifies) the visual appearance of the field when rocks/debris are being dragged rather than the visual appearance of the field when a ground-engaging tool is plugged.

Figure 2:
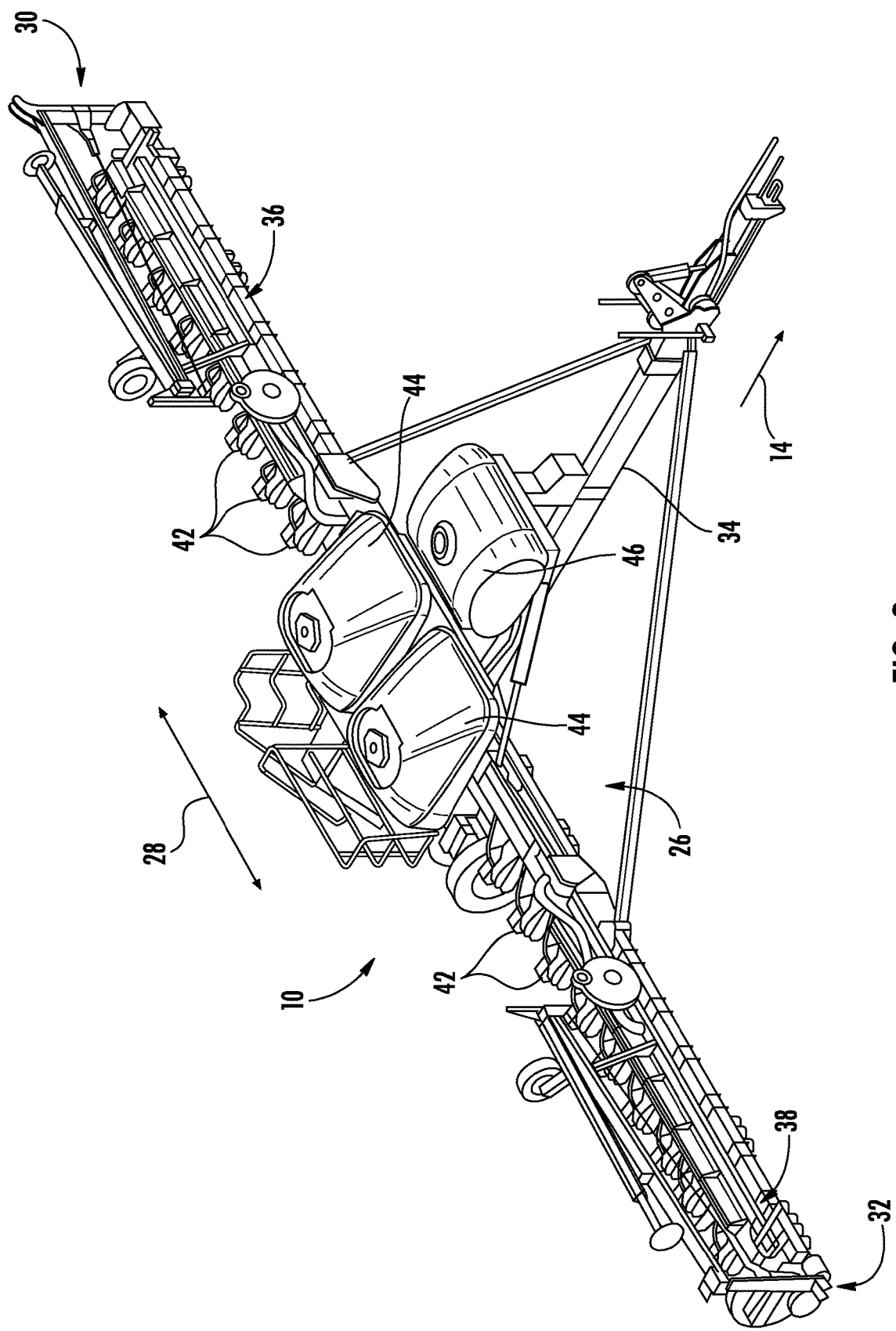
FIG. 2 illustrates a perspective view of the agricultural implement shown in FIG. 1, particularly illustrating various components of the implement.

Referring now to the drawings, FIGS. 1 and 2 illustrate differing views of one embodiment of an agricultural implement 10 in accordance with aspects of the present subject matter. Specifically, FIG. 1 illustrates a top view of the implement 10 coupled to a work vehicle 12. Additionally, FIG. 2 illustrates a perspective view of the implement 10, particularly illustrating various components of the implement 10.

In general, the vehicle 12 may be configured to tow the implement 10 across a field in a direction of travel (e.g., as indicated by arrow 14 in FIG. 1). As shown, in the illustrated embodiment, the implement 10 is configured as a seeder (e.g., a disc drill), and the vehicle 12 is configured as an agricultural tractor. However, in alternative embodiments, the implement 10 may be configured as any other suitable type of agricultural implement, such as a planter or another seed-dispensing implement, a side dresser or another fertilizer-dispensing implement, a strip tiller, a disc harrow or another tillage implement, and/or the like. Similarly, the vehicle 12 may be configured as any other suitable type of vehicle, such as an agricultural harvester, a self-propelled sprayer, and/or the like.

As shown in FIG. 1, the vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 12 relative to the ground and move the vehicle 12 in the direction of travel 14 across the field. However, in alternative embodiments, the front wheels 18 may be driven in addition to or in lieu of the rear wheels 20 and/or the rear wheels may be steerable in addition to or in lieu of the front wheels 18. Additionally, in further embodiments, the vehicle 12 may include track assemblies (not shown) in place of the front and/or rear wheels 18, 20.

Furthermore, the vehicle 12 may include one or more devices for adjusting the speed at which the vehicle 12 moves across the field in the direction of travel 14. Specifically, in several embodiments, the vehicle 12 may include an engine 22 and a transmission 24 mounted on the frame 16. In general, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine 22 to the driven wheels 20. For example, increasing the power output by the engine 22 (e.g., by increasing the fuel flow to the engine 22) and/or shifting the transmission 24 into a higher gear may increase the speed at which the vehicle 12 moves across the field. Conversely, decreasing the power output by the engine 22 (e.g., by decreasing the fuel flow to the engine 26) and/or shifting the transmission 24 into a lower gear may decrease the speed at which the vehicle 12 moves across the field.

Referring still to FIGS. 1 and 2, the implement 10 may include a frame or toolbar 26 configured to support and/or couple to one or more components of the implement 10. Specifically, in several embodiments, the toolbar 26 may extend along a lateral direction 28 between a first side 30 of the implement 10 and a second side 32 of the implement 10. As shown, the toolbar 26 may include a center section 34 and a pair of wing sections 36, 38. In one embodiment, the wing sections 36, 38 may be pivotably coupled to the center section 34 in a manner that permits the wing sections 36, 38 to fold forward to reduce the lateral width of the implement 10, such as during storage or transportation of the implement 10 on a road. Furthermore, a tow bar 40 may be coupled to the center section 34 to allow the implement 10 to be towed by the vehicle 12.

Additionally, as shown in FIG. 2, the wing sections 36, 38 may generally be configured to support a plurality of row units (or seed-planting units) 42. Each row unit 42 may, in turn, be configured to deposit seeds at a desired depth beneath the soil surface and at a desired seed spacing as the implement 10 is being towed by the vehicle 12, thereby establishing rows of planted seeds. In some embodiments, the bulk of the seeds to be planted may be stored in one or more hoppers or seed tanks 44 mounted on or otherwise supported by the toolbar 26. Thus, as seeds are planted by the row units 42, a pneumatic distribution system (not shown) may distribute additional seeds from the seed tanks 44 to the individual row units 42. Additionally, one or more fluid tanks 46 mounted on or otherwise supported by the toolbar 26 may store agricultural fluids, such as insecticides, herbicides, fungicides, fertilizers, and/or the like, which may be sprayed onto the seeds during planting.

It should be appreciated that, for purposes of illustration, only a portion of the row units 42 of the implement 10 have been shown in FIG. 2. In general, the implement 10 may include any number of row units 42, such as six, eight, twelve, sixteen, twenty-four, thirty-two, or thirty-six row units. In addition, it should be appreciated that the lateral spacing between row units 42 may be selected based on the type of crop being planted. For example, the row units 42 may be spaced approximately thirty inches from one another for planting corn, and approximately fifteen inches from one another for planting soybeans.

Figure 3:
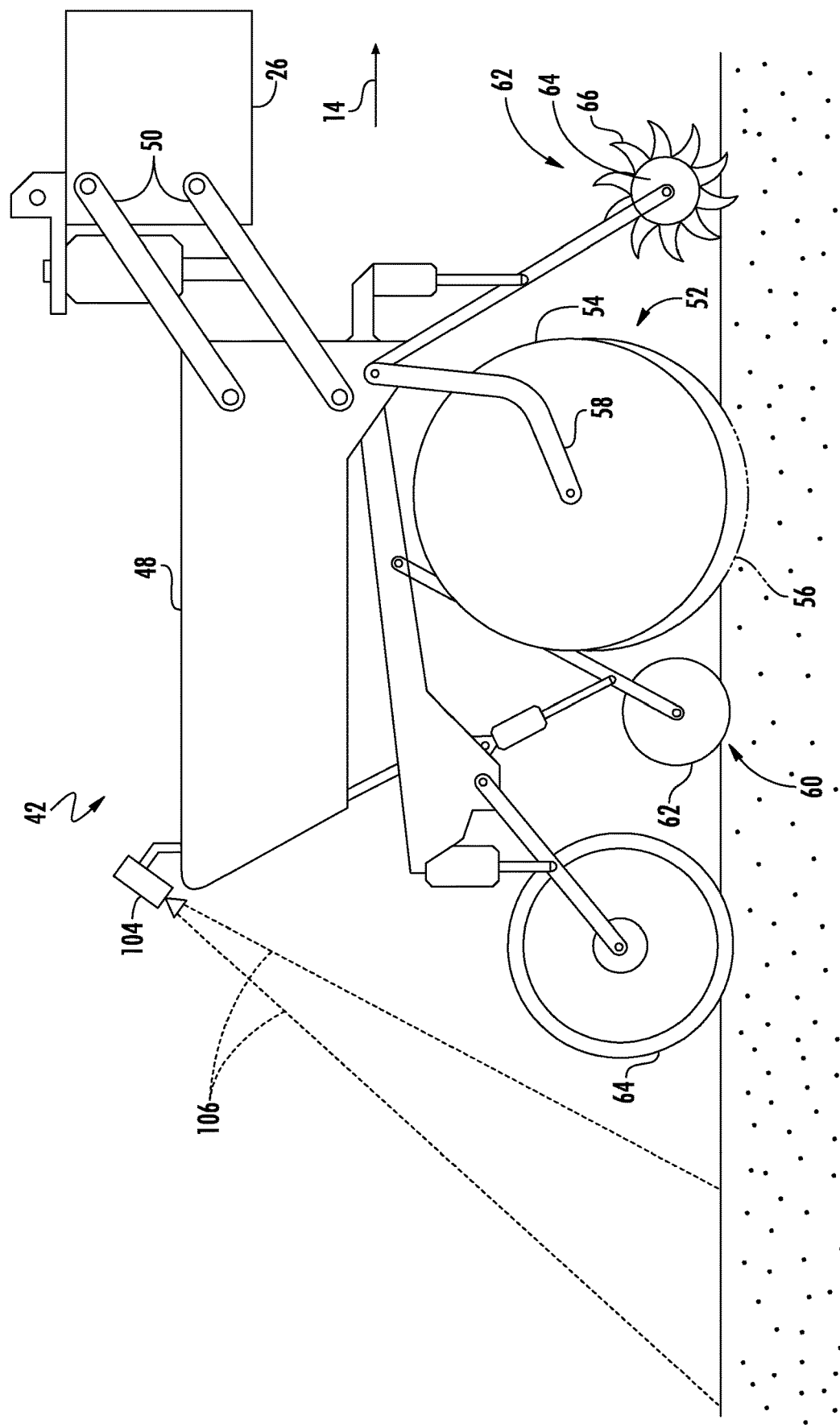
FIG. 3 illustrates a side view of one embodiment of a row unit of an agricultural implement in accordance with aspects of the present subject matter.

Referring now to FIG. 3, a side view of one embodiment of a row unit 42 is illustrated in accordance with aspects of the present subject matter. As shown, the row unit 42 may include a frame 48 adjustably coupled to the toolbar 26 by links 50. For example, one end of each link 50 may be pivotably coupled to the frame 48, while an opposed end of each link 50 may be pivotably coupled to the toolbar 26. In one embodiment, the links 50 may be parallel. However, in alternative embodiments, the row unit 42 may be coupled to the toolbar 26 in any other suitable manner.

As shown in FIG. 3, the row unit 42 may include a furrow-opening assembly 52. For example, in one embodiment, the furrow-opening assembly 52 may include a gauge wheel 54 and one or more disc openers 56 configured to excavate a furrow or trench in the soil. In general, the gauge wheel 54 may be configured to engage the top surface of the soil as the implement 10 is moved across the field. As such, the height of the disc opener(s) 56 may adjusted with respect to the position of the gauge wheel 54 to set the desired depth of the furrow being excavated. Furthermore, the furrow-opening assembly 52 may include a support arm 58 configured to adjustably couple the gauge wheel 54 to the frame 48. For example, one end of the support arm 58 may be pivotably coupled to the gauge wheel 54, while an opposed end of the support arm 58 may be pivotably coupled to the frame 48. Additionally, the disc opener(s) 56 may be coupled (e.g., bolted) to the frame 48. However, in alternative embodiments, the gauge wheel 54 and the disc opener(s) 56 may be coupled to the frame 48 in any other suitable manner. Furthermore, the furrow-opening assembly 52 may include any other suitable type of furrow-forming tool, such as a hoe(s).

Moreover, as shown, the row unit 42 may include a furrow-closing assembly 60. Specifically, in several embodiments, the furrow-closing assembly 60 may include a pair of closing discs 62 (only one of which is shown) positioned relative to each other in a manner that permits soil to flow between the discs 62 as the implement 10 is moved across the field. In this regard, the closing discs 62 may be configured to close the furrow after seeds have been deposited therein, such as by collapsing the excavated soil into the furrow. Furthermore, in alternative embodiments, the furrow-closing assembly 60 may include any other suitable number of closing discs 62, such as one closing disc 62 or three or more closing discs 62. Additionally, the row unit 42 may include a press wheel 64 configured to roll over the closed furrow to firm the soil over the seed and promote favorable seed-to-soil contact.

It should be further appreciated that the configuration of the seed-planting implement 10 and the work vehicle 12 described above and shown in FIGS. 1-3 is provided only to place the present subject matter in an exemplary field of use.

Thus, it should be appreciated that the present subject matter may be readily adaptable to any manner of implement and/or vehicle configuration.

In accordance with aspects of the present subject matter, the agricultural implement 10 may include one or more imaging devices 104 coupled thereto and/or supported thereon for capturing images or other image data associated the visual appearance of the surface of the field across which the implement 10 is traveling. Specifically, in several embodiments, the imaging device(s) 104 may be provided in operative association with the implement 10 such that the sensor(s) 110 has a field of view or sensor detection range directed towards a portion(s) of the field positioned aft of the implement 10. In one embodiment, the field(s) of view of the imaging device(s) 104 may be directed to a portion(s) of the field positioned entirely aft of the implement 10. In this regard, the imaging device(s) 104 may be used to capture image data associated with the visual appearance (e.g., the color, texture, contrast, and/or the like) of the surface of the field aft of the ground-engaging tools (e.g., the gauge wheel(s) 54, the disc opener(s) 56, the closing disc(s) 62, the press wheel(s) 64, and/or the like) the implement 10 during the performance of an agricultural operation (e.g., seed-planting operation, a tillage operation, and/or the like). That is, the imaging device(s) 104 may be configured to capture image data associated with the visual appearance of a portion of the field after such portion of the field has been engaged by the ground-engaging tools. As will be described below, by analyzing the characteristics (e.g., the apparent motion, shape, color, texture, contrast, and/or the like) of the visual appearance image data, a controller 102 may then determine when one or more of the ground-engaging tools of the implement 10 are plugged.

In general, the imaging device(s) 104 may correspond to any suitable sensing device(s) configured to detect or capture images or other image data indicative of the visual appearance of the surface of the field. For instance, in several embodiments, the imaging device(s) 104 may correspond to a suitable camera(s) configured to capture three-dimensional images of the soil surface, thereby allowing the visual appearance of the surface of the field to be determined by analyzing the content of each image. For instance, in a particular embodiment, the imaging device(s) 104 may correspond to a stereographic camera(s) having two or more lenses with a separate image sensor for each lens to allow the camera(s) to capture stereographic or three-dimensional images. In further embodiments, the imaging device(s) 104 may correspond to any other suitable sensing device(s) configured to detect or capture images or image-like data associated with the visual appearance of the surface of the field, such as a radio detection and ranging (RADAR) sensor(s) or a light detection and ranging (LIDAR) sensor(s).

It should be appreciated that the imaging device(s) 104 may be mounted on or otherwise installed on the implement 10 at any suitable location(s). For example, as shown in FIG. 3, in one embodiment, an imaging device 104 may be installed on the frame 48 of one of the row units 42 of the implement 10 such that the imaging device 104 has a field of view (e.g., as indicated by dashed lines 106 in FIG. 3) directed towards a portion of the field aft of the ground-engaging tools (e.g., the gauge wheel(s) 54, the disc opener(s) 56, the closing disc(s) 62, and/or the press wheel(s) 64) of the implement 10 relative to its direction of travel 14. As such, the imaging device 104 may be configured to capture data indicative of the visual appearance of the field after engagement by the ground-engaging tools of the implement 10. However, in other embodiments, the imaging device 104 may be installed on the toolbar 26 or at any other suitable location on the implement 10 such that its field of view 106 is directed towards a portion of the field aft of the ground-engaging tools of the implement 10. Furthermore, in alternative embodiments, the imaging device 104 may be mounted on another piece of equipment. For example, in one such alternative embodiment, the imaging device 104 may be mounted on an unmanned aerial vehicle (UAV) tethered to the implement 10. Moreover, it should be appreciated that, although FIG. 3 illustrates one imaging device 104 installed on the implement 10, any other suitable number of imaging devices 104 may be installed the implement 10, such as two or more imaging devices 110.

Figure 4:
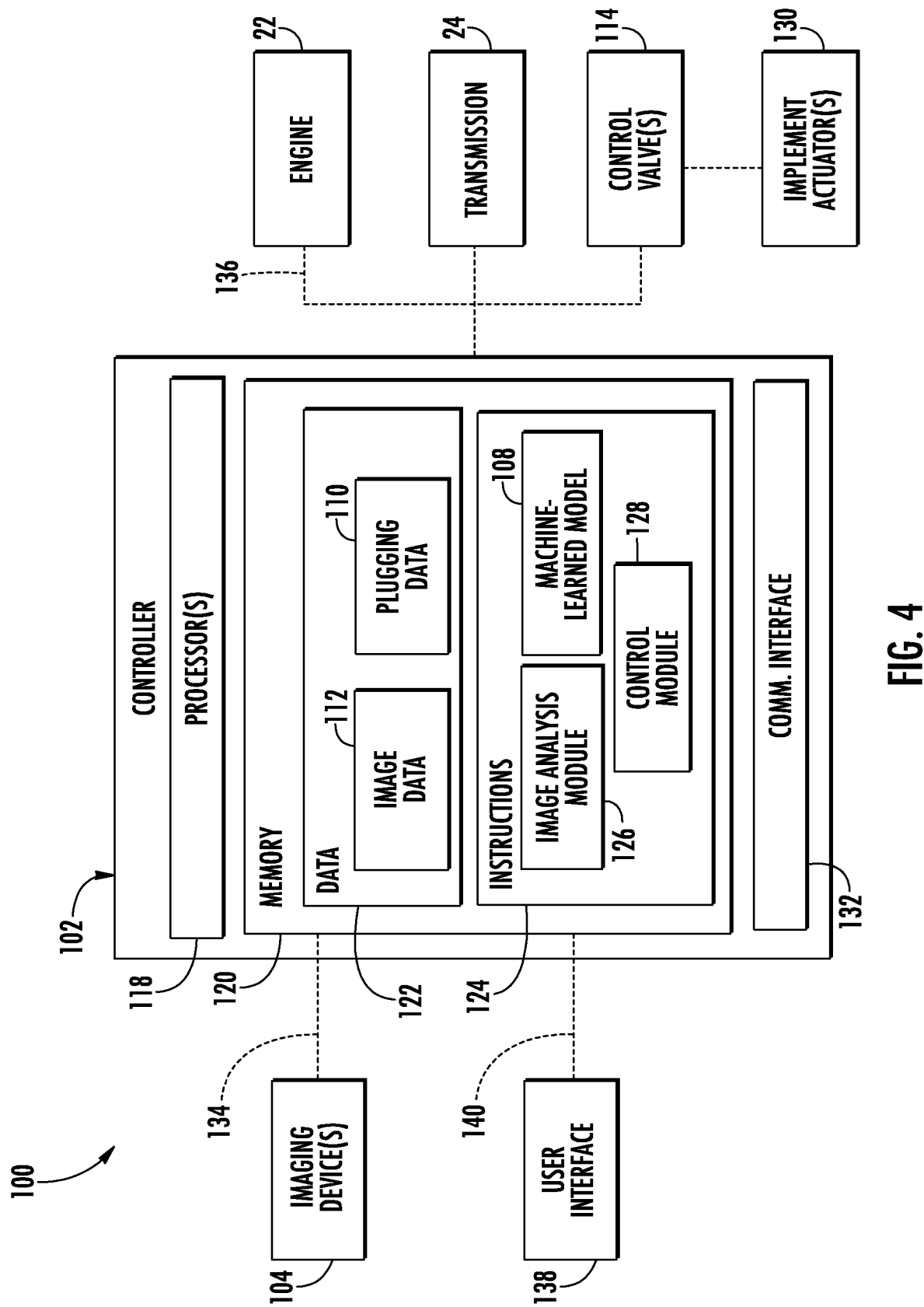
FIG. 4 illustrates a schematic view of one embodiment of a computing system in accordance with aspects of the present subject matter.

Referring now to FIGS. 3 and 4, schematic views of embodiments of a computing system 100 are illustrated in accordance with aspects of the present subject matter. In general, the system 100 will be described herein with reference to the agricultural implement 10 and the work vehicle 12 described above with reference to FIGS. 1-3. However, it should be appreciated that the disclosed system 100 may generally be utilized with agricultural implements having any other suitable implement configuration and/or work vehicles having any suitable other suitable vehicle configuration.

In several embodiments, the system 100 may include a controller 102 and various other components configured to be communicatively coupled to and/or controlled by the controller 102, such as one or more imaging devices 104 and/or various components of the agricultural implement 10 and/or the work vehicle 12. In some embodiments, the controller 102 is physically coupled to or otherwise installed on the implement 10 and/or the vehicle 12. In other embodiments, the controller 102 is not physically coupled to the implement 10 and/or the vehicle 12 (e.g., the controller 102 may be remotely located from the implement 10 and/or the vehicle 12) and instead may communicate with the implement 10 and/or the vehicle 12 over a wireless network.

Figure 5:
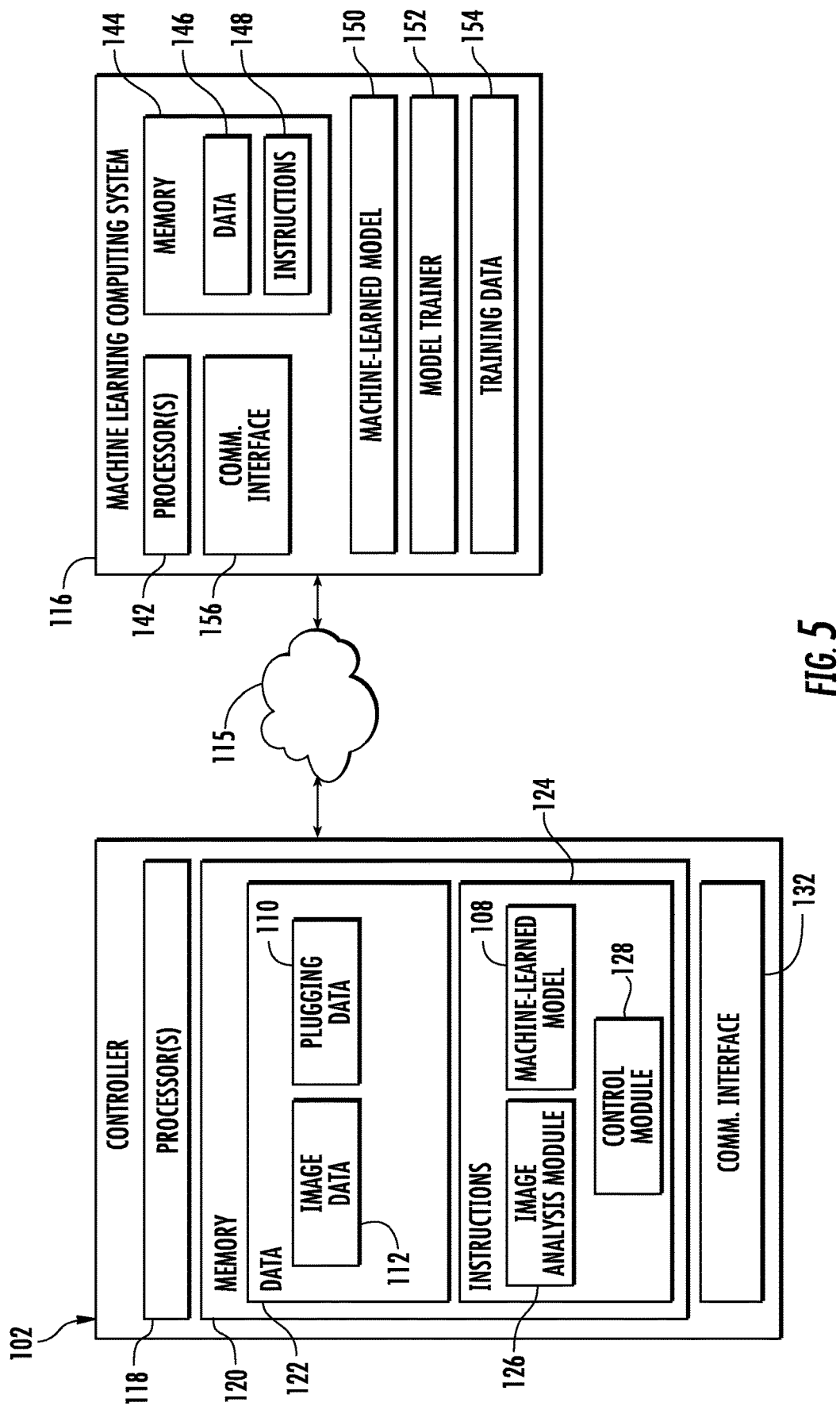
FIG. 5 illustrates a schematic view of one embodiment of a computing system in accordance with aspects of the present subject matter.

As will be described below, the controller 102 may be configured to leverage a machine-learned classification model 108 to determine when one or more ground-engaging tools of the implement 10 are plugged based at least in part on imagery of the portion of the field aft of such tools that is captured by one or more imaging devices 104. In particular, FIG. 4 illustrates a computing environment in which the controller 102 can operate to determine plugging data 110 for one or more of the ground-engaging tools of the implement 10 based on image data 112 newly received from the one or more imaging devices 104 and, further, to control one or more components of an implement and/or an associated work vehicle (e.g., the engine 22, the transmission 24, a control valve(s) 114, etc.) based on the plugging data 110. That is, FIG. 4 illustrates a computing environment in which the controller 102 is actively used in conjunction with an agricultural implement and/or an associated work vehicle (e.g., during operation of the implement and/or vehicle within a field). As will be discussed below, FIG. 5 depicts a computing environment in which the controller 102 can communicate over a network 115 with a machine learning computing system 116 to train and/or receive a machine-learned classification model 108. Thus, FIG. 5 illustrates operation of the controller 102 to train a machine-learned classification model 108 and/or to receive a trained machine-learned classification model 108 from a machine learning computing system 116 (e.g., FIG. 5 shows the "training stage"), while FIG. 4 illustrates operation of the controller 102 to use the machine-learned classification model 108 to determine when one or more ground-engaging tools of the implement 10 are plugged based on obtained imagery of a field (e.g., FIG. 4 shows the "inference stage").

Referring first to FIG. 4, in general, the controller 102 may correspond to any suitable processor-based device(s), such as a computing device or any combination of computing devices. Thus, as shown in FIG. 4, the controller 102 may generally include one or more processor(s) 118 and associated memory devices 120 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 120 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 120 may generally be configured to store information accessible to the processor(s) 118, including data 122 that can be retrieved, manipulated, created and/or stored by the processor(s) 118 and instructions 124 that can be executed by the processor(s) 118.

In several embodiments, the data 122 may be stored in one or more databases. For example, the memory 120 may include an image database 112 for storing image data received from the imaging device(s) 104. As described above, the imaging device(s) 104 may be configured to continuously or periodically capture images of portion(s) of the field aft of the implement 10 as an agricultural operation (e.g., a tillage operation, a seed-planting operation, etc.) is being performed within the field. In this regard, the images transmitted to the controller 102 from the imaging device(s) 104 may be stored within the image database 112 for subsequent processing and/or analysis. It should be appreciated that, as used herein, the term image data may include any suitable type of data received from the imaging device(s) 104 that allows for the visual appearance (e.g., the texture, color, contrast, and/or the like) of the surface of the field to be analyzed, including photographs and other image-related data (e.g., point cloud data and/or the like).

Additionally, as shown in FIG. 4, the memory 120 may include a plugging database 110 for storing information related to whether one or more ground-engaging tools of the implement 10 performing an agricultural operation on the field are plugged. For example, as indicated above, based on the image data received from the imaging device(s) 104, the controller 102 may be configured to determine when one or more of the ground-engaging tools of the implement 10 are plugged based on the visual appearance (e.g., the apparent motion, shape, texture, color, contrast, and/or the like) of the surface of the field aft of such tools as illustrated by the image data 112. The plugging determinations (e.g., plugged or not plugged) for one or more ground-engaging tools of the implement 10 made by the controller 102 may then be stored within the plugging database 110 for subsequent processing and/or analysis.

Referring still to FIG. 4, in several embodiments, the instructions 124 stored within the memory 120 of the controller 102 may be executed by the processor(s) 118 to implement an image analysis module 126. In general, the image analysis module 126 may be configured to analyze the image data 112 to determine the plugging data 110. Specifically, as will be discussed further below, the image analysis module 126 can cooperatively operate with or otherwise leverage a machine-learned classification model 108 to analyze the image data 110 to determine the plugging data 110. For example, the image analysis module 126 can perform some or all of method 200 illustrated in FIG. 6 and/or method 300 illustrated in FIG. 7. It should be appreciated that the controller 102 (e.g., the image analysis module 126) may be configured to perform the above-referenced analysis for multiple imaged sections of the field. In such instances, each section can be analyzed individually or multiple sections can be analyzed in a batch (e.g., by concatenating imagery depicting such multiple sections).

Moreover, as shown in FIG. 4, the instructions 124 stored within the memory 120 of the controller 102 may also be executed by the processor(s) 118 to implement a machine-learned classification model 108. Specifically, the machine-learned classification model 108 may be a machine-learned convolutional neural network (CNN) classification model. However, the machine-learned classification model 108 may be any suitable statistical classification method, including regression models, support-vector machines (SVM), decision trees (e.g. random forests), kernel estimators (e.g. k-Nearest Neighbor), Bayes classifiers, texton-classifiers, and/or the like. The machine-learned classification model 108 may be configured to receive imagery, process the received imagery to produce or determine one or more quantifiable parameters representative of the visual appearance of the imagery, and compute or output one or more visual appearance classifications of the imagery based on the determined visual appearance parameters. For example, such visual appearance parameters used to classify the imagery may include the shape, color, texture, contrast, and/or other similar parameters of the received imagery.

Referring still to FIG. 4, the instructions 124 stored within the memory 120 of the controller 102 may also be executed by the processor(s) 118 to implement a control module 128. In general, the control module 128 may be configured to adjust the operation of the implement 10 and/or the vehicle 12 by controlling one or more components of the implement 10 and/or the vehicle 12. Specifically, when it is determined by the image analysis module 126 that one or more ground-engaging tools of the implement 10 are plugged, the control module 128 may be configured to adjust the operation of the implement 10 and/or the vehicle 12 in a manner designed to perform one or more control actions associated with de-plugging such ground-engaging tools.

In several embodiments, when it is determined that one or more ground-engaging tools of the implement 10 are plugged, the control module 128 may be configured to adjust the operational or ground speed of the implement 10 in a manner that de-plugs such tool(s) and/or prevents/minimizes plugging of the non-plugged tool(s). In such embodiments, as shown in FIG. 4, the controller 102 may be communicatively coupled to the engine 22 and/or the transmission 24 of the vehicle 12. In this regard, the controller 102 may be configured to adjust the operation of the engine 22 and/or the transmission 24 in a manner that increases or decreases the ground speed of the work vehicle 12 and, thus, the ground speed of the implement 10, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24. In one embodiment, the implement 10 may communicate with the vehicle 12 to request or command a particular ground speed and/or particular increase or decrease in ground speed from the vehicle 12. For example, the implement 10 may include or otherwise leverage an ISOBUS Class 3 system to control the speed of the vehicle 12.

In addition to the adjusting the ground speed of the implement/vehicle 10/12 (or as an alternative thereto), the control module 128 may also be configured to adjust one or more operating parameters associated with the ground-engaging tools of the implement 10. For instance, as shown in FIG. 4, the controller 102 may be communicatively coupled to one or more control valves 114 configured to regulate the supply of fluid (e.g., hydraulic fluid or air) to one or more corresponding actuators 130 (e.g., fluid-driven cylinders) of the implement 10. In such an embodiment, by regulating the supply of fluid to the actuator(s) 130, the controller 102 may automatically adjust the penetration depth of and/or the force applied to the ground-engaging tools (e.g., the gauge wheel(s) 54, the disc opener(s) 56, the closing disc(s) 62, and/or the press wheel(s) 64) of the implement 10.

Moreover, as shown in FIG. 4, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and the imaging device(s) 104 to allow image data transmitted from the imaging device(s) 104 to be received by the controller 102. Similarly, one or more communicative links or interfaces 136 (e.g., one or more data buses) may be provided between the communications interface 132 and the engine 22, the transmission 24, the control valves 114, and/or the like to allow the controller 102 to control the operation of such system components.

Furthermore, in one embodiment, the computing system 100 may also include a user interface 138. More specifically, the user interface 138 may be configured to provide feedback (e.g., feedback associated with plugging of the ground-engaging tools of the implement 10) to the operator of the implement/vehicle 10/12. As such, the user interface 138 may include one or more feedback devices (not shown), such as display screens, speakers, warning lights, and/or the like, which are configured to provide feedback from the controller 102 to the operator. In addition, the user interface 138 may be configured to receive inputs (e.g., inputs associated with the correct classification of the image data 112) from the operator. In this regard, the user interface 138 may include one or more input devices (not shown), such as touchscreens, keypads, touchpads, knobs, buttons, sliders, switches, mice, microphones, and/or the like, which are configured to receive inputs from the operator. Furthermore, one or more communicative links or interfaces 140 (e.g., one or more data buses) may be provided between the communications interface 132 of the controller 102 and the user interface 138 to allow feedback to be transmitted from the controller 102 to the user interface 138 and/or the inputs to be transmitted from the user interface 138 to the controller 102. In one embodiment, the user interface 138 may be mounted or otherwise positioned within a cab (not shown) of the vehicle 12. However, in alternative embodiments, the user interface 138 may mounted at any other suitable location.

Referring now to FIG. 5, according to an aspect of the present disclosure, the controller 102 can store or include one or more machine-learned classification models 108. Specifically, in several embodiments, the machine-learned classification model 108 may be configured to receive imagery and to process the imagery to output one or more visual appearance classifications for the surface of the field shown in the imagery.

In some embodiments, the machine-learned classification model 108 may be a machine-learned convolutional neural network including a plurality of layers. The plurality of layers may include one or more convolutional layers, activation functions, pooling layers, and/or fully-connected layers. In one embodiment, the convolutional neural network may include a final layer. The final layer may be a fully-connected layer. Furthermore, the final layer may indicate the output of the network that assigns to the image data one of a plugged visual appearance or a non-plugged visual appearance. In some embodiments, a SoftMax function applied by and to the final layer may provide the output.

As an alternative to the convolutional neural network, other forms of neural networks may be used. Example neural networks include feed-forward neural networks, recurrent neural networks (e.g., long short-term memory recurrent neural networks), or other forms of neural networks. Neural networks may include multiple connected layers of neurons, and networks with one or more hidden layers may be referred to as "deep" neural networks. Typically, at least some of the neurons in a neural network may include non-linear activation functions.

As further examples, the machine-learned classification model 108 may include a regression model (e.g., logistic regression classifier), a support vector machine, one or more decision-tree based models (e.g., random forest models), a Bayes classifier, a K-nearest neighbor classifier, a texton-based classifier, and/or other types of models including both linear models and non-linear models. For example, texton-based classifiers can provide classifications based on an analysis of texture content included in the image data. As such, a texton-classifier can match the texture of an image to a closest match within a dictionary of textures (e.g., similar to a nearest neighbor algorithm).

In some embodiments, the machine-learned classification model 108 may be a binary classifier configured to output, for each set of received image data, a binary visual appearance classification that classifies such image data as having a plugged appearance or a non-plugged appearance. In other embodiments, the machine-learned classification model 108 may be a multi-class classifier configured to output, for each set of received image data, a multi-class visual appearance classification that classifies such image data having a non-plugged visual appearance or a visual appearance associated with one of a plurality of different types of plugged ground-engaging tools (e.g., "non-plugged" vs. "plugged gauge wheel" vs. "plugged disc opener" vs. "plugged closing disc", etc.). Other classification/labeling schemes may be used in addition or alternatively to these example schemes.

In one embodiment, the machine-learned classification model 108 may be configured to output a plurality of classifications for each image frame of the image data 112, with each classification being attached to a particular portion of such image frame. In certain instances, one or more ground-engaging tools of the implement 10 may be plugged, while one or more other ground-engaging tools may not be plugged. In such instances, the visual appearance of the field behind the plugged ground-engaging tool(s) may differ from the visual appearance of the field behind the non-plugged ground-engaging tool(s). In such instances, the machine-learned classification model 108 may be configured to output a non-plugged visual appearance classification(s) for the portion(s) of the field depicted in each image frame that is located aft of and aligned with the plugged tool(s) in the lateral direction 28. Conversely, the machine-learned classification model 108 may be configured to output a non-plugged visual appearance classification(s) for the portion(s) of the field depicted in each image frame that is located aft of and aligned with the non-plugged tool(s) in the lateral direction 28.

In some embodiments, the machine-learned classification model 108 may further provide, for each of one or more classes, a numerical value descriptive of a degree to which it is believed that the input data should be classified into the corresponding class. In some instances, the numerical values provided by the machine-learned classification model may be referred to as "confidence scores" that are indicative of a respective confidence associated with classification of the input into the respective class. In some embodiments, the confidence scores may be compared to one or more thresholds to render a discrete categorical classification. In some embodiments, only a certain number of classes (e.g., one) with the relatively largest confidence scores may be selected to render a discrete categorical prediction.

In some embodiments, the controller 102 may receive the one or more machine-learned classification models 108 from the machine learning computing system 116 over network 115 and may store the one or more machine-learned classification models 108 in the memory 120. The controller 102 may then use or otherwise run the one or more machine-learned classification models 108 (e.g., via the processor(s) 118).

The machine learning computing system 116 may include one or more processors 142 and a memory 144. The one or more processors 142 may be any suitable processing device such as those described with reference to the processor(s) 118. The memory 144 may include any suitable storage device(s) such as those described with reference to memory 120.

The memory 144 may store information that can be accessed by the one or more processors 142. For instance, the memory 144 (e.g., one or more non-transitory computer-readable storage mediums, memory devices) may store data 146 that can be obtained, received, accessed, written, manipulated, created, and/or stored. In some embodiments, the machine learning computing system 116 may obtain data from one or more memory device(s) that are remote from the system 116. Furthermore, the memory 144 may also store computer-readable instructions 148 that can be executed by the processor(s) 142. The instructions 148 may, in turn, be software written in any suitable programming language or may be implemented in hardware. Additionally or alternatively, the instructions 148 can be executed in logically and/or virtually separate threads on processor(s) 142. For example, the memory 144 may store instructions 148 that when executed by the processor(s) 142 cause the processor(s) 142 to perform any of the operations and/or functions described herein.

In some embodiments, the machine learning computing system 116 may include one or more server computing devices. When the machine learning computing system 116 includes multiple server computing devices, such server computing device(s) may operate according to various computing architectures, including, for example, sequential computing architectures, parallel computing architectures, or some combination thereof.

In addition to or as an alternative to the model(s) 108 at the controller 102, the machine learning computing system 116 can include one or more machine-learned classification models 150. For example, the model(s) 150 may be the same as described above with reference to the model(s) 108.

In some embodiments, the machine learning computing system 116 may communicate with the controller 102 according to a client-server relationship. For example, the machine learning computing system 116 may implement the machine-learned classification models 150 to provide a web service to the controller 102. For example, the web service can provide image analysis for plugging detection as a service. Thus, machine-learned classification models 108 can be located and used at the controller 102 and/or machine-learned classification models 150 can be located and used at the machine learning computing system 116.

In some embodiments, the machine learning computing system 116 and/or the controller 102 may train the machine-learned classification models 108 and/or 150 through use of a model trainer 152. The model trainer 152 may train the machine-learned classification models 108 and/or 150 using one or more training or learning algorithms. One example training technique is backwards propagation of errors ("backpropagation"). Gradient-based or other training techniques may be used.

In some embodiments, the model trainer 152 may perform supervised training techniques using a set of labeled training data 154. For example, the labeled training data 154 may include image frames, with each image frame being labeled (e.g., manually by an expert and/or manually by a user of the models) with a "correct" or ground-truth label. Thus, each training example may include an image frame and a corresponding ground-truth classification for the image frame. The labels used for the training data 154 may match any of the example labelling schemes described herein, including binary labels (e.g., plugged visual appearance or non-plugged visual appearance), multi-label labels (e.g., plugged gauge wheel visual appearance, plugged closing disc visual appearance, non-plugged visual appearance, etc.), or other labelling schemes.

In other embodiments, the model trainer 152 may perform unsupervised training techniques using a set of unlabeled training data 154. The model trainer 152 may perform a number of generalization techniques to improve the generalization capability of the models being trained. Generalization techniques include weight decays, dropouts, or other techniques. The model trainer 152 may be implemented in hardware, software, firmware, or combinations thereof.

Thus, in some embodiments, the model(s) may be trained at a centralized computing system (e.g., at "the factory") and then distributed to (e.g., transferred to for storage by) specific controllers. Additionally or alternatively, the models can be trained (or re-trained) based on additional training data generated by the user. For example, as will be described below, the image data 112 may be displayed to the operator of the implement/vehicle 10/12 (e.g., via the user interface 138) as the implement/vehicle 10/12 travels across the field. Thereafter, the operator may input (e.g., via the user interface 138) the correct or ground-truth classification to the computing system 100 for each display image frame, which may then be used to train the model(s) This process may be referred to as "personalization" of the model(s) and may allow the operator to further train the models to provide improved (e.g., more accurate) predictions for unique field conditions experienced by the operator.

The network(s) 115 may be any type of network or combination of networks that allows for communication between devices. In some embodiments, the network(s) 115 may include one or more of a local area network, wide area network, the Internet, secure network, cellular network, mesh network, peer-to-peer communication link and/or some combination thereof and can include any number of wired or wireless links. Communication over the network(s) 115 may be accomplished, for instance, via a communications interface using any type of protocol, protection scheme, encoding, format, packaging, etc. Additionally, the machine learning computing system 144 may also include a communications interface 156 to communicate with any of the various other system components described herein.

FIGS. 4 and 5 illustrate example computing systems that may be used to implement the present disclosure. Other computing systems may be used as well. For example, in some embodiments, the controller 102 may include the model trainer 152 and the training dataset 154. In such embodiments, the machine-learned classification model(s) 108 may be both trained and used locally at the controller 102. As another example, in some embodiments, the controller 102 may not connected to other computing systems.

Figure 6:
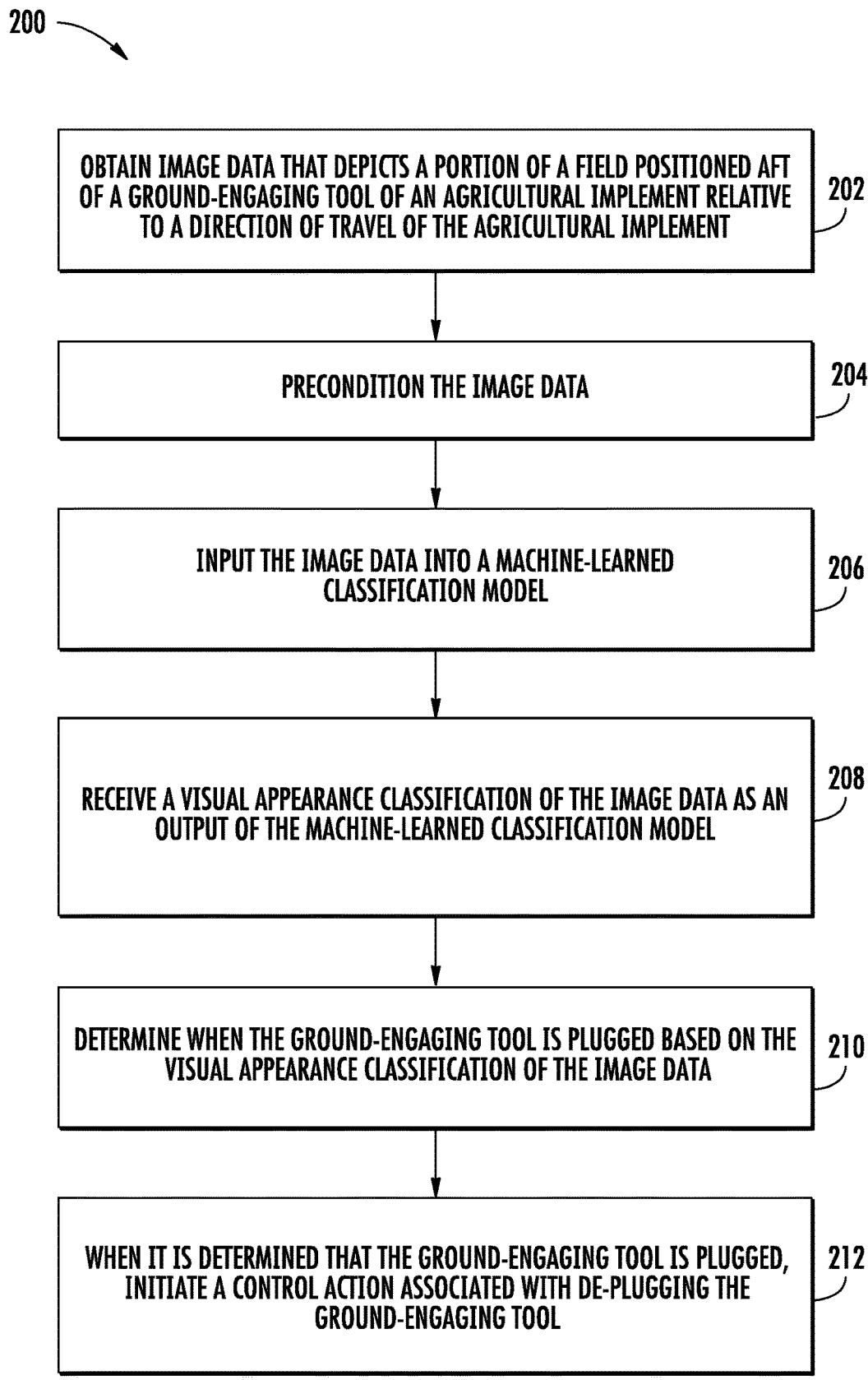
FIG. 6 illustrates a flow diagram of one embodiment of a method for detecting plugging of a ground-engaging tool of an agricultural implement in accordance with aspects of the present subject matter.

Referring now to FIG. 6, a flow diagram of one embodiment of a method 200 for detecting plugging of a ground-engaging tool of an agricultural implement based on image data of a field is illustrated in accordance with aspects of the present subject matter. In general, the method 200 will be described herein with reference to the agricultural implement 10 and the work vehicle 12 shown in FIGS. 1-3, as well as the various system components shown in FIGS. 4 and/or 5. However, it should be appreciated that the disclosed method 200 may be implemented with agricultural implements having any other suitable implement configuration, work vehicles having any other suitable vehicle configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include obtaining image data depicting a portion of a field positioned aft of a ground-engaging tool of an agricultural implement relative to a direction of travel of the agricultural implement. As described above, the implement 10 may include one or more ground-engaging tools (e.g., the gauge wheel(s) 54, the disc opener(s) 56, the closing disc(s) 62, and/or the press wheel(s) 64) that engage (e.g., contact) the soil in the field during the performance of an agricultural operation. In this regard, the visual appearance (e.g., color, texture, contrast, and/or the like) of the surface of the field may generally be indicative of the performance of the ground-engaging tool(s). For example, the visual appearance of the field behind a plugged tool may differ from the visual appearance of the field behind a non-plugged tool. As such, the controller 102 may be communicatively coupled to one or more imaging devices 104, with each imaging device 104 configured to capture image data associated with the visual appearance of a portion of the field position aft of one or more ground-engaging tools of the implement 10.

In some embodiments, the image data obtained at (202) may include a single image frame. Thus, in some embodiments, the method 200 may be performed iteratively for each new image frame as such image frame is received. For example, method 200 may be performed iteratively in real-time as new images are received from the imaging device(s) 104, while the imaging device(s) 104 are moved throughout the field (e.g., as a result of being installed on the implement 10 or a UAV tethered to the implement 10).

In other embodiments, the image data obtained at (202) may include a plurality of image frames. In such embodiments, the plurality of image frames may be concatenated or otherwise combined and processed as a single batch (e.g., by way of a single performance of method 200 over the batch). For example, in one embodiment, image frames from several image capture devices 104 may be concatenated to form a single image frame depicting a portion of the field aft of the implement 10 and extending the entire width of the implement 10 along the lateral direction 28.

Furthermore, at (204), the method 200 may include preconditioning the image data. Specifically, in several embodiments, the image analysis module 126 of the controller 102 may be configured to precondition the received image data. For example, such preconditioning may include performing histogram equalization (e.g., for brightness balance), camera calibration (e.g., to rectify the image data so that lens distortion does not have as significant an effect), and/or enhancing the image to announce a specific feature. In addition, the preconditioning may include changing the contrast, applying one or more filters, changing the reflectance or frequency wavelengths, and/or other processing operations. Moreover, in some embodiments, the preconditioning performed at (204) may be specific to the particular classification model being used.

As shown in FIG. 6, at (206), the method 200 may include inputting the image data into a machine-learned classification model. As described above, the machine-learned classification model may be configured to receive imagery and to process the imagery to output one or more visual appearance classifications for the imagery. As such, the image analysis module 126 of the controller 102 may be configured to input the image data 112 into the machine-learned classification model 108. In some embodiments, the inputted image data may correspond to or otherwise include an entirety of the image data, such that all of the image data is analyzed. In other embodiments, the inputted image data may correspond to or otherwise include only a portion or subset of the image data. Using only a subset of the image data may enable reductions in processing time and requirements.

Additionally, at (208), the method 200 may include receiving a visual appearance classification of the image data as an output of the machine-learned classification model. For example, as indicated above, the image analysis module 126 of the controller 102 may be configured to receive a respective visual appearance classification for the image data as an output of the machine-learned classification model 108. As described above, in some embodiments, the classification received for the image data at (208) can be a binary visual appearance classification that classifies the image data (e.g., one or more image frames or portions of such image frame(s)) as having a plugged visual appearance or a non-plugged visual appearance. In other embodiments, the classification may be a multi-class visual appearance classification that classifies the image data as having a non-plugged visual appearance or a visual appearance associated with one of a plurality of different types of plugged ground-engaging tools (e.g., "non-plugged" vs. "plugged gauge wheel" vs. "plugged disc opener" vs. "plugged closing disc"). Other classification/labeling schemes can be used in addition or alternatively to these example schemes.

As shown in FIG. 6, at (210), the method 200 may include determining when the ground-engaging tool of the implement is plugged based on the visual appearance classification of the image data. For example, the image analysis module 126 of the controller 102 may be configured to determine when one or more ground-engaging tools of the implement 10 are plugged based on the received visual appearance classification(s) (e.g., plugged visual appearance or non-plugged visual appearance) of the image data 112. For example, when the received visual appearance classification is associated with a plugged visual appearance, the image analysis module 126 may determine that one or more ground-engaging tools of the implement 10 are plugged.

Moreover, at (210), in several embodiments, the image analysis module 126 may be further configured to determine when the ground-engaging tool(s) are plugged based on the received classification(s) and the associated confidence scores. As described above, the machine-learned classification model 108 may also output confidence scores descriptive of the degree to which it is believed that the image data should be classified into a corresponding visual appearance class. For example, in such an embodiment, the image analysis module 126 may determine that the ground-engaging tool(s) are plugged when the received classification is associated with a plugged visual appearance and the associated confidence score is over a threshold value (e.g., greater than eighty percent). Conversely, when the confidence score associated with a plugged visual appearance for the image data 112 falls below the threshold value, the image analysis module 126 may be configured to determine that the ground-engaging tools are not plugged.

In one embodiment, at (210), the image analysis module 126 may be configured to determine that one or more ground-engaging tools of the implement 10 are plugged after a threshold amount of the image data 112 has been classified as having a plugged visual appearance. As described above, the image data 112 received by the controller 102 may include a plurality of image frames. In this regard, the output of the machine learned classification model 108 may be one or more visual appearance classifications for each image frame of the image data 112. As such, the image analysis module 126 may be configured to determine that one or more ground-engaging tools of the implement 10 are plugged after a successive number of image frames (e.g., twenty image frames) or portions of image frames have been classified as having a plugged visual appearance.

Furthermore, at (210), the method may further be configured to identify which ground-engaging tool(s) of the implement 10 are plugged based on the visual appearance classification of the image data. As described above, in one embodiment, the machine-learned classification model 108 may be configured to output a plurality of classifications for each image frame of the image data 112, with each classification being attached to a particular portion of such image frame. For example, a given image frame may include a first portion associated with one or more ground-engaging tools that has been identified as having a non-plugged visual appearance and a second portion associated with one or more other ground-engaging tool(s) that has been identified has having a plugged visual appearance. In such an embodiment, the image analysis module 126 may be configured to determine (e.g., via imaging device calibration) which ground-engaging tool(s) are plugged based on the location(s) of the portion(s) of the image frame(s) having a plugged visual appearance classification.

In addition, after determining that one or more ground-engaging tools of the implement are plugged at (210), the method 200 may include, at (212), initiating a control action associated with de-plugging the tool(s). For example, as indicated above, the control module 128 of the controller 102 may be configured to control the operation of the implement 10 and/or the vehicle 12 to initiate one or more control actions associated with de-plugging the ground-engaging tool(s). For example, in one embodiment, the control module 128 may be configured to notify the operator of the implement/vehicle 10/12 that the one or more ground-engaging tools of the implement 10 are plugged (e.g., via the user interface 138). Additionally or alternatively, the control module 128 may be configured to adjust one or more operating parameters of the implement 10 and/or the vehicle 12, such as ground speed of the implement/vehicle 10/12, the penetration depth of the ground-engaging tool(s) of the implement 10, and/or the force applied to the tool(s), in a manner that de-plugs the tool(s).

Figure 7:
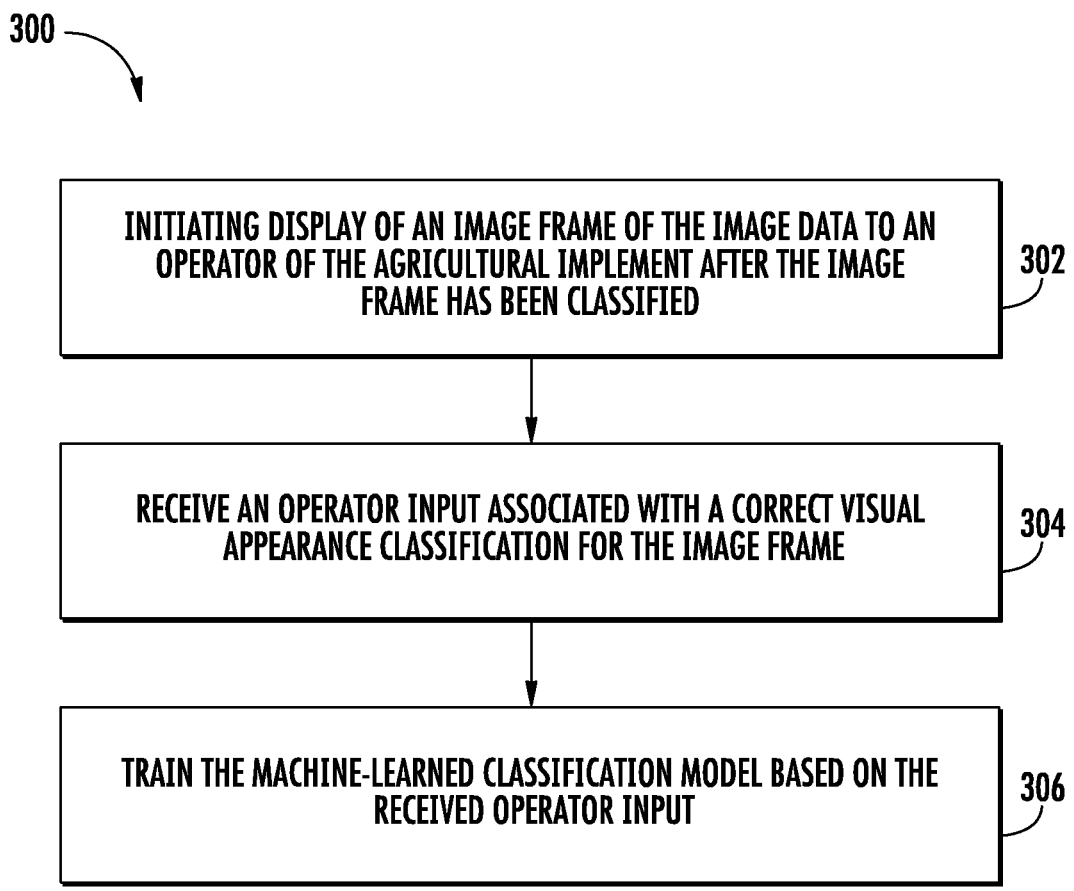
FIG. 7 illustrates a flow diagram of one embodiment of a method for training a machine-learned classification model for use in detecting plugging of a ground-engaging tool of an agricultural implement in accordance with aspects of the present subject matter.

Referring now to FIG. 7, a flow diagram of one embodiment of a method 300 for training a machine-learned classification model for use in detecting plugging of a ground-engaging tool of an agricultural implement is illustrated in accordance with aspects of the present subject matter. In general, the method 300 will be described herein with reference to the agricultural implement 10 and the work vehicle 12 shown in FIGS. 1-3, as well as the various system components shown in FIGS. 4 and/or 5. However, it should be appreciated that the disclosed method 300 may be implemented with agricultural implements having any other suitable implement configuration, work vehicles having any other vehicle suitable configuration, and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (302), the method 300 may include initiating display of an image frame of the image data to an operator of the agricultural implement after the image frame has been classified. As described above, the machine-learned classification model 108 may output one or more visual appearance classifications for each image frame of the image data 112. For example, in one embodiment, each image frame may be classified as having a plugged visual appearance or a non-plugged visual appearance. After such classification, the control module 128 may be configured to initiate display (e.g., via the user interface 138) of one or more of the image frames to the operator of the implement/vehicle 10/12.

Additionally, at (304), the method 300 may include receiving an operator input associated with a correct visual appearance classification for the image frame. For example, the operator of the implement 10/12 may view the displayed frame(s) and, for each image frame, provide (e.g., the user interface 138) the correct or ground-truth visual appearance classification for such image frame.

Furthermore, as shown in FIG. 7, at (306), the method may include training the machine-learned classification model based on the received operator input. As described above, in certain embodiments, the controller 102 may include the model trainer 152. As such, in one embodiment, the model trainer 152 may be configured to train the machine-learned classification model 108 based on the received operator input(s) associated with the correct or ground-truth visual appearance classification for the image frames of the image data 112 as provided by the operator. In such an embodiment, such "on-the-fly" training may allow the operator "personalize" the machine-learned classification model 108 to provide improved (e.g., more accurate) predictions for the unique field conditions experienced by the operator.

It is to be understood that the steps of the methods 200, 300 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the methods 200, 300, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the methods 200, 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A computing system, comprising:
one or more processors; and
one or more non-transitory computer-readable media that collectively store:
a machine-learned classification model configured to receive imagery and process the imagery to output one or more visual appearance classifications for the imagery; and
instructions that, when executed by the one or more processors, configure the computing system to perform operations, the operations comprising:
obtaining image data that depicts a portion of a field positioned aft of a ground-engaging tool of an agricultural implement relative to a direction of travel of the agricultural implement;
inputting the image data into the machine-learned classification model;
receiving a visual appearance classification of the image data as an output of the machine-learned classification model; and
determining when the ground-engaging tool is plugged based on the visual appearance classification of the image data.

2. The computing system of claim 1, wherein obtaining the image data comprises obtaining image data captured by an imaging device installed on the agricultural implement such that the imaging device has a field of view directed entirely behind the ground-engaging tool.

3. The computing system of claim 1, wherein:
obtaining the image data comprises obtaining image data that depicts a portion of the field positioned aft of a plurality of ground-engaging tools of the agricultural implement relative to the direction of travel;
determining when the ground-engaging tool is plugged comprises determining when one of the plurality of ground-engaging tools is plugged based on the visual appearance classification of the image data; and
when it is determined that one of the plurality of ground-engaging tools is plugged, the operations further comprise identifying which ground-engaging tool of the plurality of ground-engaging tools is plugged based on the visual appearance classification of the image data.

4. The computing system of claim 1, wherein the machine-learned classification model comprises a convolutional neural network.

5. The computing system of claim 1, wherein the image data comprises a plurality of image frames.

6. The computing system of claim 5, wherein the machine-learned classification model comprises a binary classifier configured to output for, each image frame, a binary visual appearance classification that classifies such image frame as a plugged visual appearance or a non-plugged visual appearance.

7. The computing system of claim 1, wherein operations further comprise:
initiating display of an image frame of the image data to an operator of the agricultural implement after the image frame has been classified;
receiving an operator input associated with a correct visual appearance classification for the image frame; and
training the machine-learned classification model based on the received operator input.

8. The computing system of claim 1, wherein, when it is determined that the ground-engaging tool is plugged, the operations further comprise initiating a control action associated with de-plugging the ground-engaging tool.

9. The computing system of claim 8, wherein the control action comprises notifying an operator of the agricultural implement that the ground-engaging tool is plugged.

10. The computing system of claim 8, wherein the control action comprises adjusting an operating parameter of the agricultural implement.

11. A computer-implemented method, comprising:
obtaining, with a computing system comprising one or more computing devices, image data that depicts a portion of a field positioned aft of a ground-engaging tool of an agricultural implement relative to a direction of travel of the agricultural implement;
inputting, with the computing system, the image data into a machine-learned classification model configured to configured to receive imagery and process the imagery to output one or more visual appearance classifications for the imagery;

receiving, with the computing system, a visual appearance classification of the image data as an output of the machine-learned classification model; and determining, with the computing system, when the ground-engaging tool is plugged based on the visual appearance classification of the image data.

12. The computer-implemented method of claim 11, wherein obtaining the image data comprises obtaining image data captured by an imaging device installed on the agricultural implement such that the imaging device has a field of view directed entirely behind the ground-engaging tool.

13. The computer-implemented method of claim 11, wherein:

obtaining, with the computing system, the image data comprises obtaining image data that depicts a portion of the field positioned aft of a plurality of ground-engaging tools of the agricultural implement relative to the direction of travel;

determining, with the computing system, when the ground-engaging tool is plugged comprises determining when one of the plurality of ground-engaging tools is plugged based on the visual appearance classification of the image data; and when it is determined that one of the plurality of ground-engaging tools is plugged, the method further comprises identifying, with the computing system, which ground-engaging tool of the plurality of ground-engaging tools is plugged based on the visual appearance classification of the image data.

14. The computer-implemented method of claim 11, wherein the machine-learned classification model comprises a convolutional neural network.

15. The computer-implemented method of claim 11, wherein the image data comprises a plurality of image frames.

16. The computer-implemented method of claim 11, further comprising:

initiating, with the computing system, display of an image frame of the image data to an operator of the agricultural implement after the image frame has been classified;

receiving, with the computing system, an operator input associated with a correct visual appearance classification for the image frame; and training, with the computing system, the machine-learned classification model based on the received operator input.

17. The computer-implemented method of claim 11, wherein, when it is determined that the ground-engaging tool is plugged, the computer-implement method further comprises initiating, with the computing system, a control action associated with de-plugging the ground-engaging tool.

* * * * *